US008347809B2

(12) United States Patent
Takahashi et al.

(10) Patent No.: US 8,347,809 B2
(45) Date of Patent: Jan. 8, 2013

(54) SLOT NOZZLE ASSEMBLY, SLOT COATING GUN, SHIM PLATE, AND METHOD OF EXTRUDING A FOAMABLE MELTED MATERIAL IN A WIDE BAND

(75) Inventors: Shinya Takahashi, Tokyo (JP); Hitoshi Takahashi, Yamato (JP)

(73) Assignee: Nordson Corporation, Westlake, OH (US)

( * ) Notice: Subject to any disclaimer, the term of this patent is extended or adjusted under 35 U.S.C. 154(b) by 982 days.

(21) Appl. No.: 12/174,867

(22) Filed: Jul. 17, 2008

(65) Prior Publication Data

US 2009/0022890 A1    Jan. 22, 2009

(30) Foreign Application Priority Data

Jul. 19, 2007  (JP) ................. 2007-187962

(51) Int. Cl.
B05B 7/00 (2006.01)
B05D 1/02 (2006.01)
(52) U.S. Cl. .................... 118/300; 427/421.1
(58) Field of Classification Search .......... 239/551; 425/133.5, 382.4, 462
See application file for complete search history.

(56) References Cited

U.S. PATENT DOCUMENTS

| 2,803,041 A * | 8/1957 | Hill et al. ................. 264/75 |
| 4,844,004 A | 7/1989 | Hadzimihalis et al. |
| 5,500,274 A | 3/1996 | Francis et al. |
| 5,533,675 A | 7/1996 | Benecke et al. |
| 5,728,219 A | 3/1998 | Allen et al. |
| 5,740,963 A | 4/1998 | Riney et al. |
| 5,916,393 A * | 6/1999 | Shaffer et al. ............. 156/82 |
| 2004/0256496 A1 | 12/2004 | Harris et al. |

FOREIGN PATENT DOCUMENTS

| AU | 199936812 B2 | 9/1999 |
| DE | 19530516 A1 | 2/1997 |
| DE | 10320813 A1 | 12/2004 |
| EP | 0194074 B1 | 9/1986 |
| EP | 0683027 A2 | 11/1995 |
| JP | 57110440 A | 7/1982 |
| JP | 59182825 A | 10/1984 |
| JP | 06142587 A | 5/1994 |
| JP | 06198239 A | 7/1994 |
| JP | 7308618 A | 11/1995 |
| JP | 11226469 A | 8/1999 |
| WO | 2004/041447 A1 | 5/2004 |

OTHER PUBLICATIONS

European Patent Office, European Search Report in EP Application No. 08160453, Jan. 5, 2009.
European Patent Office, Extended European Search Report in EP Application No. 10175003, Oct. 6, 2011.
Chinese Patent Office, Office Action in CN Application No. 200810128149.2, Oct. 10, 2011.

* cited by examiner

*Primary Examiner* — Dah-Wei Yuan
*Assistant Examiner* — Charles Capozzi
(74) *Attorney, Agent, or Firm* — Wood, Herron & Evans, L.L.P.

(57) ABSTRACT

A slot nozzle assembly for extruding a foamable melted material in a wide band including a plurality of foamable melted material passages, lateral distribution flow routes communicating with the plurality of foamable melted material passages, a restriction member disposed inside the lateral distribution flow routes, a slot for discharging foamable melted material, and a converging portion which communicates with the lateral distribution flow routes and the slot, and whose cross-section area gradually becomes smaller toward the slot.

25 Claims, 9 Drawing Sheets

SLOT NOZZLE ASSEMBLY, SLOT COATING GUN, SHIM PLATE, AND METHOD OF EXTRUDING A FOAMABLE MELTED MATERIAL IN A WIDE BAND

The present application claims the priority of Japanese Patent Application No. 2007-187962 filed Jul. 19, 2007 under 35 U.S.C. §119. The disclosure of that priority application is hereby fully incorporated by reference herein.

TECHNICAL FIELD

The present invention pertains to a slot nozzle assembly, slot coating gun, shim plate, and a method of extruding a foamable melted material in a wide band.

BACKGROUND

In the past, in the field of adhesives and sealing materials, foam melt applicators for coating a foamable melted material have been known. See Japanese Document No. JP S59-182825A. A foam melt applicator is a device which mechanically mixes an inert gas into melted hot melt and discharges a bubbly hot melt. Coating a foamable melted material can reduce running costs and lengthen open time before clamping. Other effects include shortening the setting time after clamping, making it easier to thinly spread an adhesive layer after clamping, increased adhesion strength with porous materials, increased filling efficiency on a bonded item that has a rough surface, formation of a coating film with elasticity, etc. Therefore foamable melted materials are widely used.

For example, there is a device and method which manufacture an insulated plate by spreading foaming-type hot melt from a slot nozzle onto a long narrow band of material that is continuously transported, and gluing another long narrow band of material thereon. See Japanese Document No. JP S57-11440A.

Also, in order to prevent premature foaming of a foamable melted material inside a slot nozzle, there is a slot nozzle which can keep a foamable melted material at a pressure higher than the critical pressure at which the foamable melted material does not foam until the foamable melted material reaches the outlet part of the slot. See Japanese Document No. JP H7-308618A. This slot nozzle is provided with a converging slot part in which the thickness of the slot is gradually reduced from the wide slot part, where the slot is thick, to the outlet slot part, where the slot is thin.

To coat a foamable melted material in a wide band one must use a slotted discharge device. When one attempts to discharge foamable melted material with a slotted discharge device, many intrinsic problems occur.

DETAILED DESCRIPTION

Usually, a foamable melted material foams after being extruded from a slotted discharge device and forms a foam layer on the substrate. However, sometimes a bubbling sound can be heard from the slotted discharge device, and in this sort of case, holes occur in the foam layer formed on the substrate. This is because before the foamable melted material is extruded from the slotted discharge device, gases dissolved in the foamable melted material started to foam inside the slotted discharge device and premature foaming occurred. When premature foaming occurs, the texture of the foam layer becomes unallowably rough, and holes are formed in the foam layer. A foam layer that has holes reduces the quality of the product. Therefore, one must keep the pressure inside a slotted discharge device at a pressure higher than the critical pressure at which the foamable melted material starts to foam so that the foamable melted material does not foam inside the slotted discharge device.

In addition, a foamable melted material must be uniformly distributed across the entire width of the slot. Therefore, it is necessary to disperse the foamable melted material widely and thinly in the interior of a slotted discharge device.

If the flow speed of the foamable melted material inside a slotted discharge device is nonuniform, or if the pressure distribution of the foamable melted material is biased, the diameter of bubbles inside the foam layer coated on the substrate becomes nonuniform.

Figure 15:
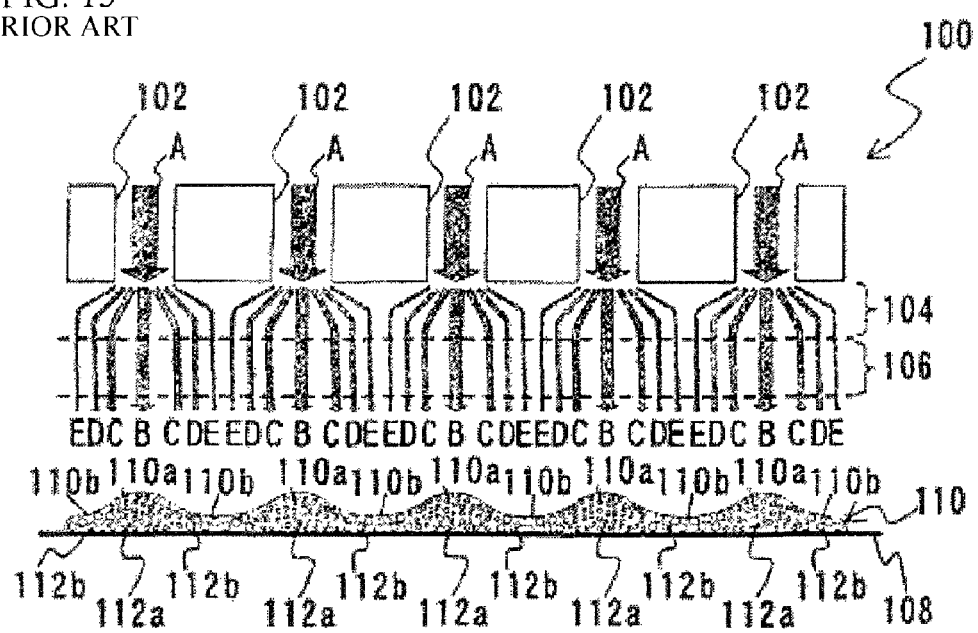
FIG. 15 is an explanatory diagram schematically showing the flow of a foamable melted material in the interior of a conventional slot nozzle assembly and bubbles in the foam layer coated on a substrate.

FIG. 15 is an explanatory diagram schematically showing the flow of a foamable melted material in the interior of a conventional slot nozzle assembly and bubbles in the foam layer coated on a substrate.

Figure 17:
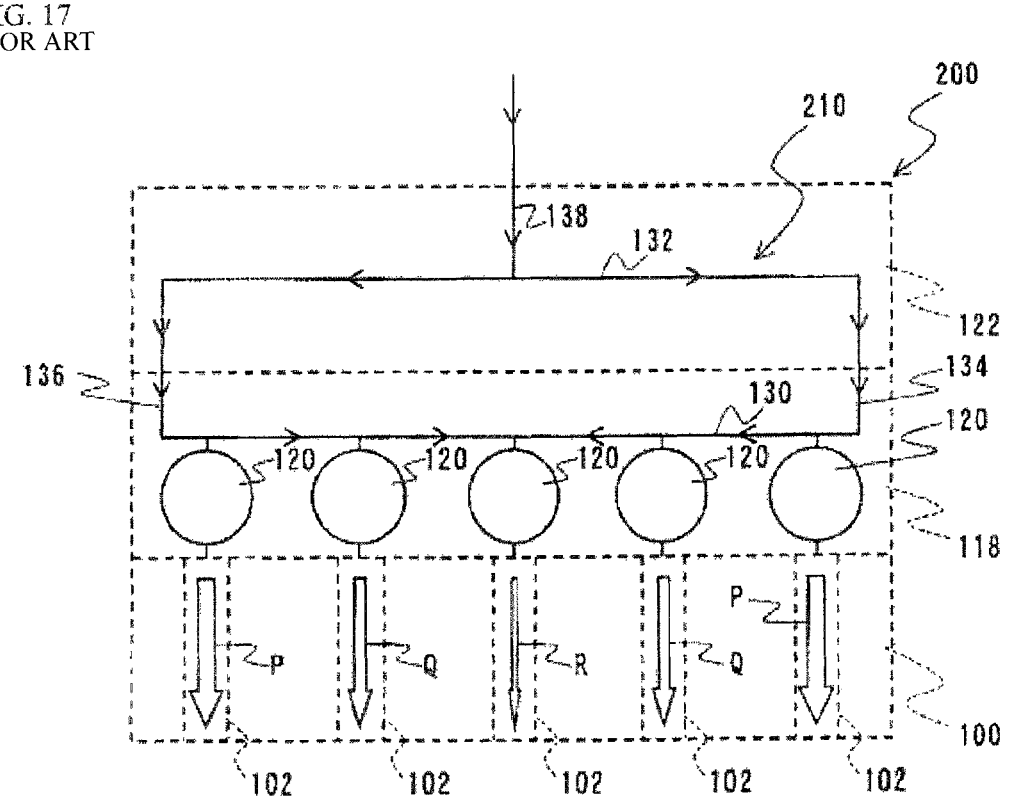
FIG. 17 is an explanatory drawing showing a foamable melted material distribution manifold of a conventional slot coating gun.

A slot nozzle assembly 100 is attached to a control module 118 (FIG. 17). The slot nozzle assembly 100 is provided with five vertical passages 102. The vertical passages 102 respectively communicate with valve assemblies 120 (FIG. 17) provided in the control module 118 (FIG. 17). The five vertical passages 102 communicate with a single lateral distribution flow route 104 provided in the slot nozzle assembly 100. The lateral distribution flow route 104 communicates with a slender slot 106 which extends in the longitudinal direction of the slot nozzle assembly 100.

When a valve (not shown in the drawing) opens in the valve assembly 120 (FIG. 17), the foamable melted material passes through the vertical passage 102 as indicated by arrow A and flows to the lateral distribution flow route 104. In the lateral distribution flow route 104, the foamable melted material is laterally dispersed along the lateral distribution flow route 104 as indicated by arrows B, C, D, and E, passes through the slot 106, is extruded on a substrate 108, and forms a foam layer 110. The thickness of the arrows A, B, C, D, and E represents the flow amount of foamable melted material. The flow amount of foamable melted material flowing from the lateral distribution flow route 104 to the slot 106 is large directly under the vertical passage 102 as indicated by arrow B, and the flow amount diminishes with distance from the vertical passage 102 as indicated by the thicknesses of arrows C, D, and E. Pressure also diminishes with the reduction in flow amount.

These changes in flow amount and pressure change the thickness of the foam layer 110 formed on the substrate 108 and the diameter of its bubbles. In FIG. 15, the substrate 108 is transported in the direction perpendicular to the drawing. FIG. 15 shows a cross-section view of the foam layer 110 taken along the direction perpendicular to the substrate 108's transport direction. The foam layer 110 includes a thick-layer portion 110a formed directly under the vertical passage 102 and a thin-layer portion 110b formed between adjacent vertical passages 102. The diameter of a bubble 112a formed inside the thick-layer portion 110a is small, and the diameter of a bubble 112b formed inside the thin-layer portion 110b is large. Changes in the thicknesses of these layers and the bubble diameters appear as lines in the band-like foam layer 110 coated on the substrate 108. That is, the thick-layer portion 110a, which has small bubbles under the vertical passage 102, appears as five lines, and the thin-layer portion 110b, which has large bubbles between adjacent vertical passages 102, appears as six lines. These two types of lines appear alternatingly aligned in the width direction of the band-like foam layer 110. These lines greatly diminish the quality of the product, and worsen the product appearance.

Figure 16:
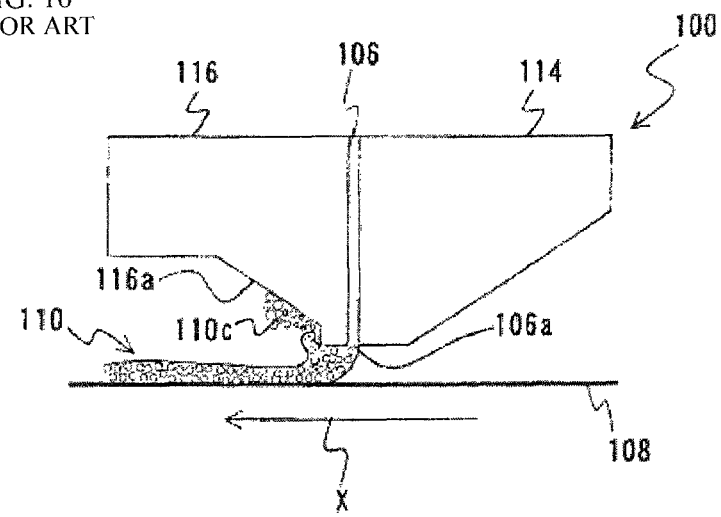
FIG. 16 is an explanatory diagram showing foam accumulated on the surface of the rear nozzle block of a conventional slot nozzle assembly.

FIG. 16 is an explanatory diagram showing foam accumulated on the surface of the rear nozzle block of a conventional slot nozzle assembly.

The substrate 108 is transported in the direction indicated by arrow X. The slot nozzle assembly 100 consists of a front nozzle block 114 and a rear nozzle block 116; the slot 106 is formed between the front nozzle block 114 and the rear nozzle block 116. The front nozzle block 114 is positioned at the upstream side of the substrate 108's transport direction X. The rear nozzle block 116 is positioned at the downstream side of the substrate 108's transport direction X.

The foamable melted material extruded from the outlet 106a of the slot 106 foams and coats the substrate 108 and forms the foam layer 110 at the downstream side of the transport direction X. When doing so, part 110c of the foam coated on the substrate 108 adheres to the surface 116a of the rear nozzle block 116. Also, the volume of the foam may sometimes become very large and it adheres to the surface 116a of the rear nozzle block 116. Foam part 110c gradually accumulates, and deteriorates. Subsequently, the foam part 110c drips on the foam layer 110. In particular, large drips of foam are visible on the foam layer, so the product is soiled and the quality of the product is reduced.

FIG. 17 is an explanatory drawing showing a foamable melted material distribution manifold 210 of a conventional slot coating gun 200.

The slot coating gun 200 consists of a slot nozzle assembly 100, control module 118, and gun body 122. The control module 118 is provided with five valve assemblies 120, and these valve assemblies 120 respectively communicate with the vertical passages 102 provided in the slot nozzle assembly 100. A lateral distributional passage 130 is provided in the control module 118, and the lateral distribution passage 130 communicates with the five valve assemblies 120. A lateral distribution passage 132 is provided in the gun body 122. The two ends of the lateral distribution passage 130 of the control module 118 communicate with the two ends of the lateral distribution passage 132 of the gun body 122 via passage 134 and passage 136 respectively. A passage 138 is provided in the gun body 122 so that the lateral distribution passage 132 communicates with a foam station (not shown in the drawing). The foamable melted material distribution manifold 210 is constituted by the lateral distribution passage 130, lateral distribution passage 132, passage 134, and passage 136.

Foamable melted material is sent from a foam station (not shown in the drawing) through the passage 138 to the foamable melted material distribution manifold 210. The passage 138 is connected to essentially the center of the lateral distribution passage 132 of the gun body 122. Foamable melted material from the passage 138 is distributed left and right from essentially the center of the lateral distribution passage 132, and flows to the passage 134 and passage 136 respectively at both ends of the lateral distribution passage 132. Foamable melted material from the passage 134 and passage 136 enters both ends of the lateral distribution passage 130 of the control module 118, and flows toward the center of the lateral distribution passage 130. The foamable melted material is supplied to the five valve assemblies 120, which communicate with the lateral distribution passage 130. The pressure and flow amount of the foamable melted material supplied to the valve assemblies 120 near both ends of the lateral distribution passage 130 become larger than the pressure and flow amount of the foamable melted material supplied to the valve assemblies 120 at the center of the lateral distribution passage 130. Therefore, the pressure and flow amount of the foamable melted material supplied from the valve assemblies 120 to the vertical passages 102 of the slot nozzle assembly 100 gradually become smaller from both ends of the slot nozzle assembly 100 towards its center, as indicated by the thickness of arrows P, Q, and R in FIG. 17. Thus there is a problem with nonuniform pressure and flow amount of the foamable melted material supplied from the foamable melted material distribution manifold 210 to the plurality of valve assemblies 120.

The present invention provides the following exemplary type of slot nozzle assembly in order to solve the problems described above.

That is, a slot nozzle assembly 2 for extruding a foamable melted material in a wide band is provided with a plurality of foamable melted material passages 20, lateral distribution flow routes 21, 22 communicating with the plurality of foamable melted material passages, a restriction member in the form of a shim plate 8 disposed inside the lateral distribution flow routes, a slot 23 for discharging foamable melted material, and a converging portion 22a which communicates with the lateral distribution flow routes and the slot, and whose cross-section area gradually becomes smaller toward the slot.

As a result, it is possible to keep the pressure of the foamable melted material inside the slot nozzle assembly at critical pressure or higher so that the foamable melted material does not foam inside the slot nozzle assembly. Also, it is possible to make uniform the pressure and flow distribution of the foamable melted material inside the lateral distribution flow path.

Also, the present invention provides the following exemplary type of slot coating gun.

That is, a slot coating gun 1 for extruding a foamable melted material in a wide band is provided with an inlet passage 34 for receiving foamable melted material, a plurality of valve assemblies 28, a foamable melted material distribution manifold 27 communicating with the inlet passage and the plurality of valve assemblies, a plurality of foamable melted material passages 20 respectively communicating with the plurality of valve assemblies, lateral distribution flow routes 21, 22 communicating with the plurality of foamable melted material passages, a restriction member 8 disposed inside the lateral distribution flow routes, a slot 23 for discharging foamable melted material, and a converging portion 22a which communicates with the lateral distribution flow routes and the slot, and whose cross-section area gradually becomes smaller toward the slot. The foamable melted material distribution manifold comprises a first lateral distribution passage 29 communicating with the plurality of valve assemblies, a second lateral distribution passage 30 communicating with the inlet passage, two end passages 31, 32 respectively connecting both ends of the first lateral distribution passage and both ends of the second lateral distribution passage, and a traverse passage 33 connecting the first lateral distribution passage and the second lateral distribution passage between adjacent valve assemblies.

As a result, it is possible to make the pressure and flow amount of the foamable melted material supplied to the plurality of valve assemblies essentially uniform.

A hot air outlet 26a for discharging hot air may be provided at the downstream side of the slot in the transport direction of a substrate on which a foaming melting material is coated.

As a result, the foam of the extruded foamable melted material is separated from the nozzle surface by the hot air. That is, it makes it easy to peel off foam adhered to the nozzle.

Also, the present invention provides the following exemplary type of shim plate.

That is, a shim plate 8 is used in the slot nozzle assembly 2 for extruding a foamable melted material in a wide band; and the slot nozzle assembly includes a front nozzle block 6 provided with the plurality of foamable melted material passages 20 and the first lateral distribution flow route 21 communicating with the plurality of foamable melted material passages, and a rear nozzle block 7 provided with the second lateral distribution flow route 22 disposed opposite the first lateral distribution flow route and with a converging portion 22a whose cross-section area gradually becomes smaller extending downward from the second lateral distribution flow route. The shim plate is provided with many narrow through holes 8a communicating with the first lateral distribution flow route and the second lateral distribution flow route when disposed between the front nozzle block and the rear nozzle block, and a cut-out part 8b that works with the rear face 6a of the front nozzle block and the front face 7a of the rear nozzle block to define a wide slot 23, and the shim plate has a thinness T in order to make the thickness of the slot small so that the foamable melted material inside the converging portion is kept at critical pressure or higher.

The slot thickness (gap) is made small by reducing the thickness of the shim plate. As a result, the pressure inside the second lateral distribution flow route, which has the converging portion, can be kept at critical pressure or higher, and it is possible to prevent foaming inside the second lateral distribution flow route.

Also, the present invention provides the following exemplary of method of extruding a foamable melted material in a wide band.

That is, a method of extruding a foamable melted material in a wide band is provided, and includes a step of passing a foamable melted material from the plurality of foamable melted material passages 20 to the first lateral distribution flow route 21, a step of restricting the flow of the foamable melted material from the first lateral distribution flow route to the second lateral distribution flow route 22 using a shim plate 8 in order to keep the pressure of the foamable melted material inside the first lateral distribution flow route at critical pressure or higher, a step of restricting the flow of the foamable melted material from the second lateral distribution flow route to the slot 23 using the thickness T of the slot in order to keep the pressure of the foamable melted material inside the second lateral distribution flow route at critical pressure or higher, and a step of extruding the foamable melted material from the slot to a substrate in a wide band.

As a result, it is possible to keep the pressure of the foamable melted material inside the first lateral distribution flow route and second lateral distribution flow route at critical pressure or higher so that foaming does not occur before the foamable melted material is discharged. Also, it is possible to make the pressure and flow distribution of the foamable melted material in the first and second lateral distribution float routes essentially uniform.

Below, the present invention shall be described based on a preferred embodiment, with reference to drawings. However, the dimensions, material, shape, relative dispositions, etc. of the constituent components described in the following embodiments do not restrict the scope of this invention, as long as they are not specially and particularly described.

Figure 1:
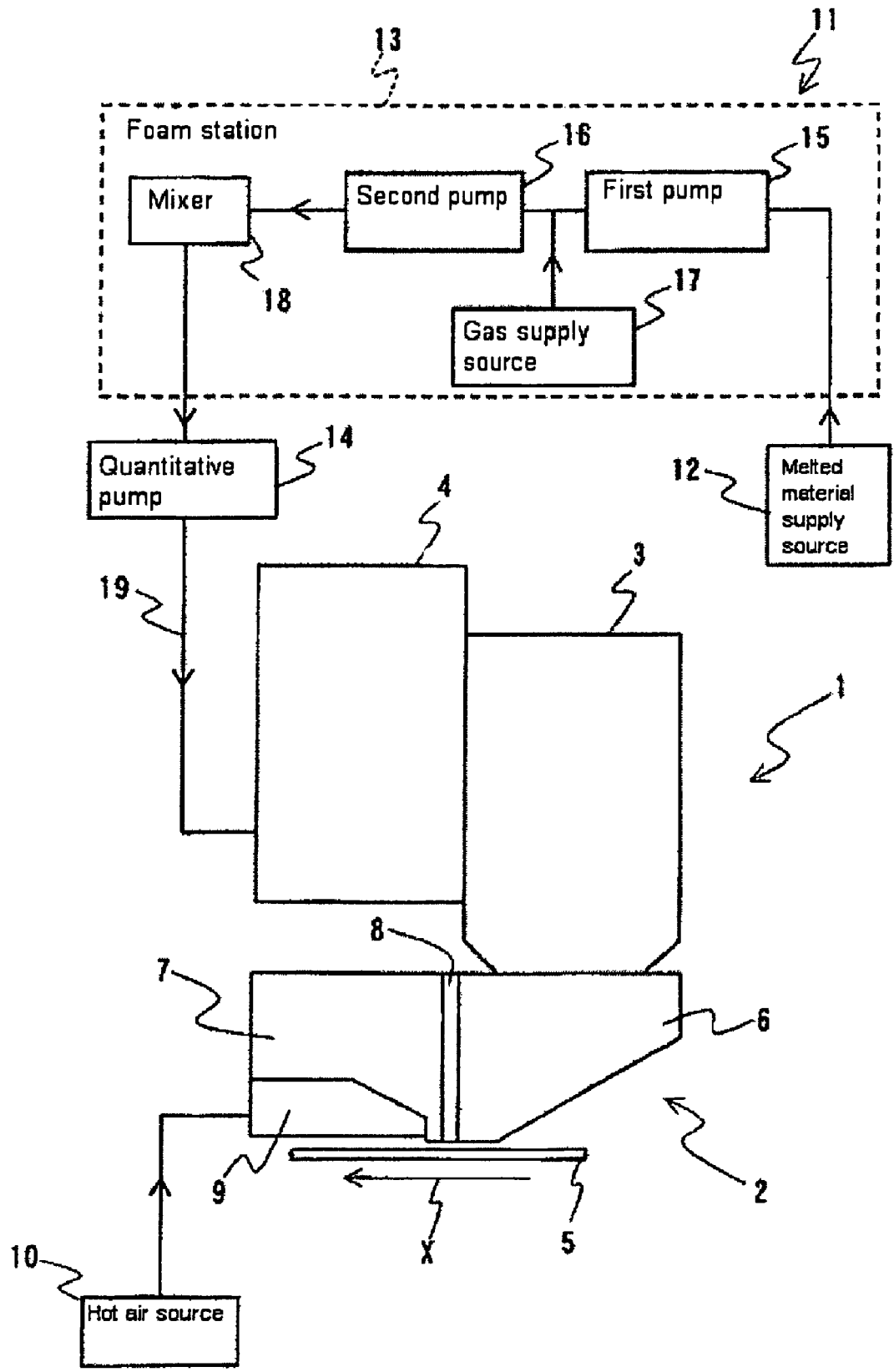
FIG. 1 is a diagram showing one embodiment in accordance with the present invention, including a slot coating gun and a system for supplying foamable melted material.

FIG. 1 is a diagram showing one embodiment in accordance with the present invention, including a slot coating gun and a system for supplying a foamable melted material.

The wide slot coating gun 1 consists of the slot nozzle assembly 2, control module 3, and gun body 4. A wide flat substrate 5 is transported in the direction indicated by arrow X below the slot nozzle assembly 2, either touching or not touching the slot nozzle assembly 2. The slot nozzle assembly 2 consists of the front nozzle block 6, rear nozzle block 7, shim plate 8 disposed between the front nozzle block 6 and rear nozzle block 7, and an air block 9 attached to the rear nozzle block 7. The front nozzle block 6 is positioned at the upstream side of the substrate 5 relative to transport direction X. The rear nozzle block 7 is positioned at the downstream side of the substrate 5 relative to transport direction X. The air block 9 is supplied with hot air from a hot air source 10.

The gun body 4 is supplied with a foamable melted material from a foamable melted material supply system 11. The gun body 4 is provided with a cartridge heater (not shown in the drawing) and a temperature sensor (not shown in the drawing). The foamable melted material passes through the gun body 4 and is sent to the control module 3.

The control module 3 is provided with an opening/closing valve (not shown in the drawing). When the opening/closing valve is open, the foamable melted material flows to the slot nozzle assembly 2. When the opening/closing valve is closed, flow of foamable melted material to the slot nozzle assembly 2 is interrupted.

The foamable melted material supply system 11 consists of a melted material supply source 12, a foam station 13, and a quantitative pump 14.

The melted material supply source 12 consists of a tank and a heater for melting a solid or semi-solid polymeric substance in the tank. The melted material inside the tank is supplied to the foam station 13.

The foam station 13 mixes a gas (dry air, nitrogen gas, carbon dioxide gas, etc.) into the melted polymeric substance and makes a foamable melted material. The foamable melted material is kept in a mixed state (liquid state) as long as it is at the critical pressure at which the gas dissolved in the melted substance starts to foam or at a higher pressure. When the foaming melted substance is exposed to atmospheric pressure, the gas is generated from the melted substance in the form of bubbles and forms a foam, and the bubbles enlarge and the volume expands.

The foam station 13 consists of a first pump (gear pump) 15, a second pump (gear pump) 16, a gas supply source 17, and a mixer 18. The first pump 15 pressurizes and sends melted material from the melted material supply source 12 to the second pump 16. The gas supply source 17 introduces a gas into the melted material between the first pump 15 and the second pump 16. By setting a difference in flow amounts between the first pump 15 and the second pump 16, gas is introduced from the gas supply source 17 into the melted material. The mixer 18 receives the melted material, to which gas has been introduced from the second pump 16, mixes the gas in the melted material, and makes the foamable melted material. Foamable melted material from the mixer 18 is supplied to the gun body 4 of the slot coating gun 1 by the quantitative pump 14 via a hot melt hose 19.

Figure 2:
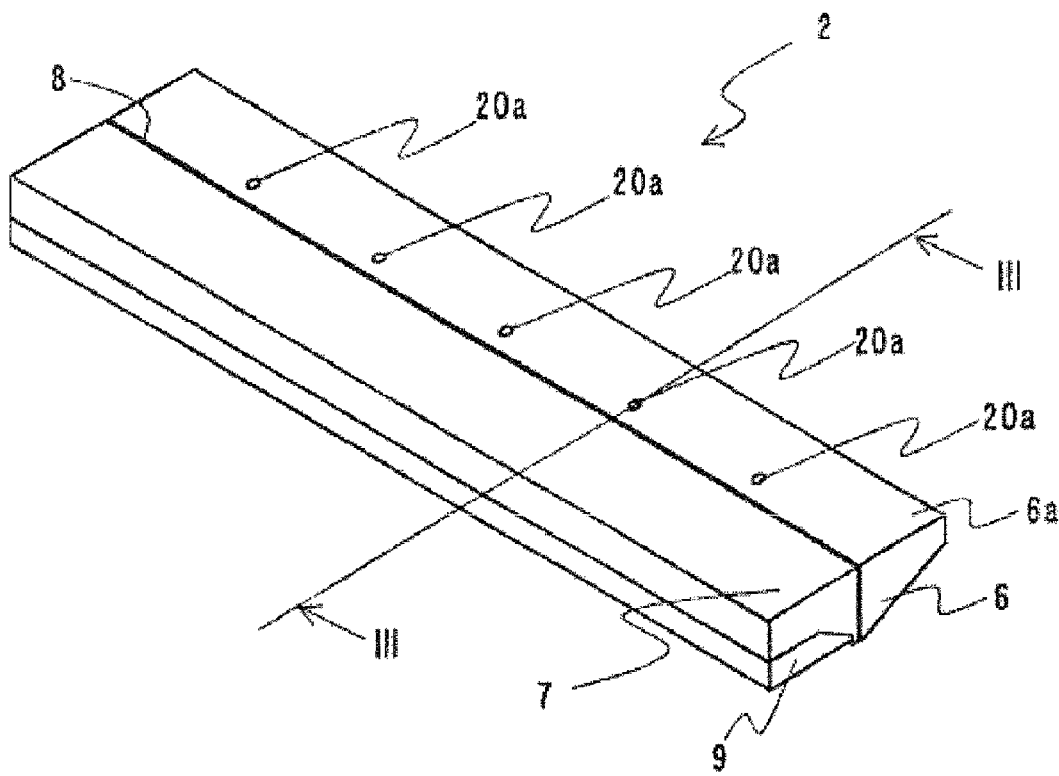
FIG. 2 is an oblique view of the slot nozzle assembly.
Figure 3:
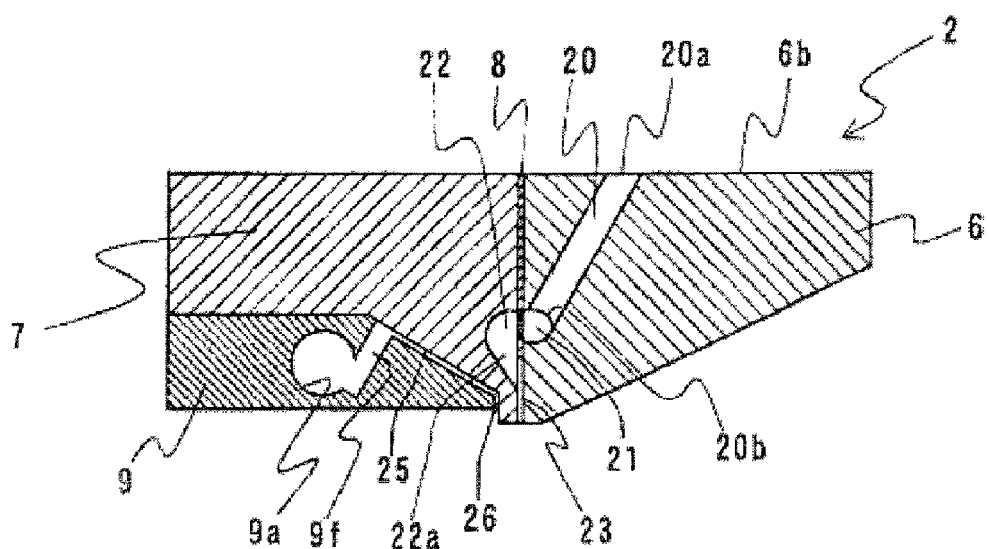
FIG. 3 is a cross-section view of the slot nozzle assembly taken along line III-III in FIG. 2.
Figure 4:
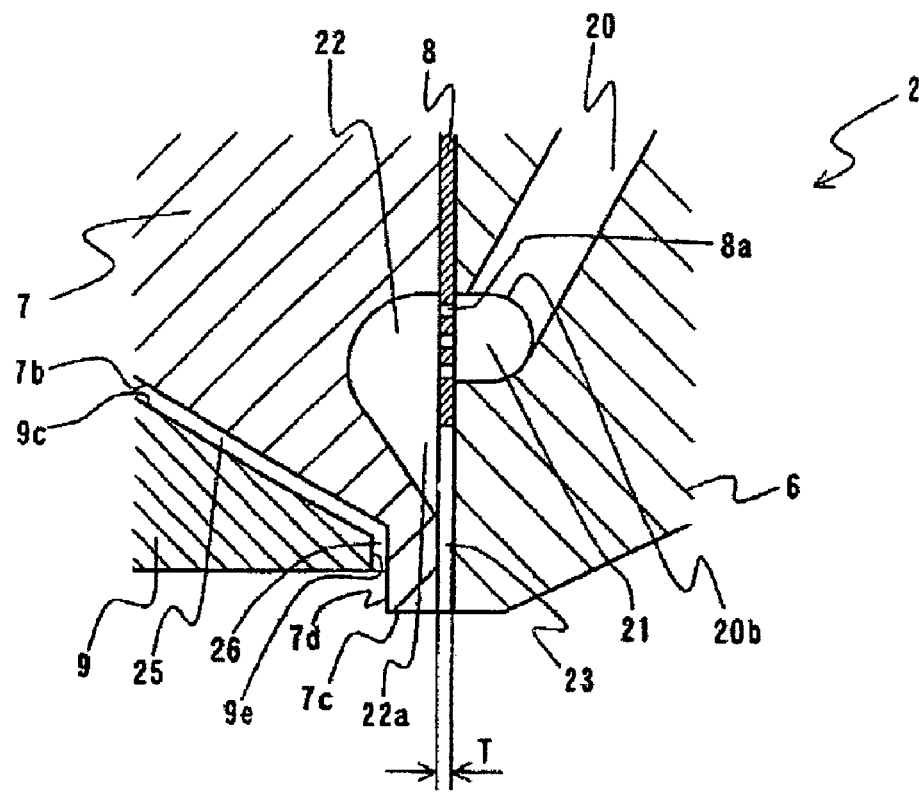
FIG. 4 is a partial enlarged view of the slot nozzle assembly.

FIG. 2 is an oblique view of the slot nozzle assembly 2. FIG. 3 is a cross-section view of the slot nozzle assembly 2 taken along line III-III in FIG. 2. FIG. 4 is a partial enlarged view of the slot nozzle assembly 2.

Figure 5:
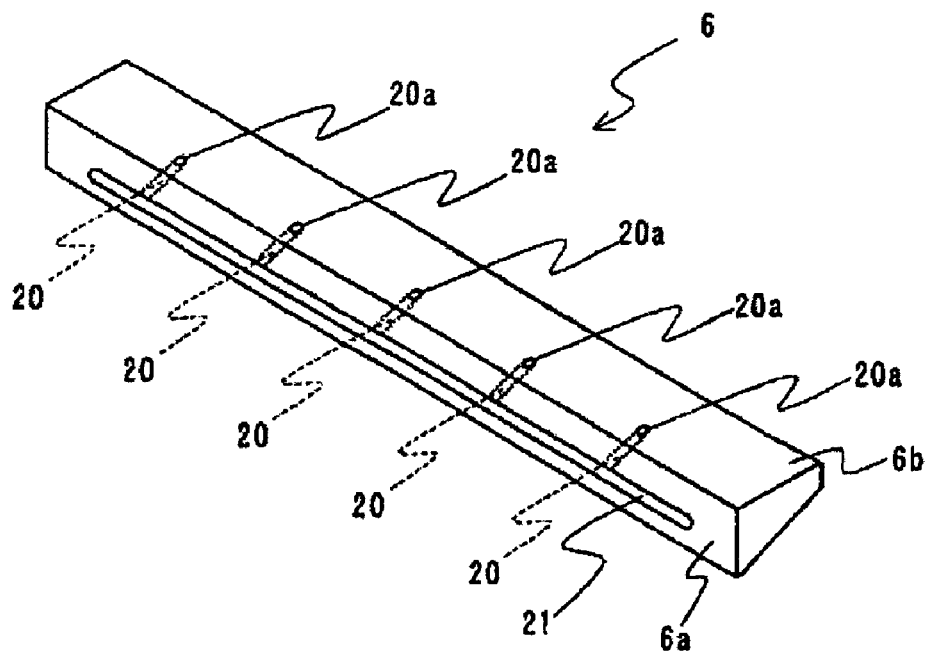
FIG. 5 is an oblique view of the front nozzle block.

FIG. 5 is an oblique view of the front nozzle block 6. The front nozzle block 6 is provided with the five vertical passages 20, and with the single shared first lateral distribution flow route 21, which extends horizontally. The first lateral distribution flow route 21 is formed at the rear face 6a of the front nozzle block 6, and extends along the longitudinal direction of the front nozzle block 6. The inlets 20a of the five vertical passages 20 open in the top face 6b of the front nozzle block 6. The outlets 20b of the 5 vertical passages 20 open at the first lateral distribution flow route 21.

The inlets 20a of the five vertical passages 20 respectively communicate with the five opening/closing valves (not shown in the drawing) provided in the control module 3. When the opening/closing valves are open, the foamable melted material flows to the inlets 20a of the vertical passages 20, passes through the vertical passages 20, and flows into the first lateral distribution flow route 21 from the outlets 20b.

Figure 6:
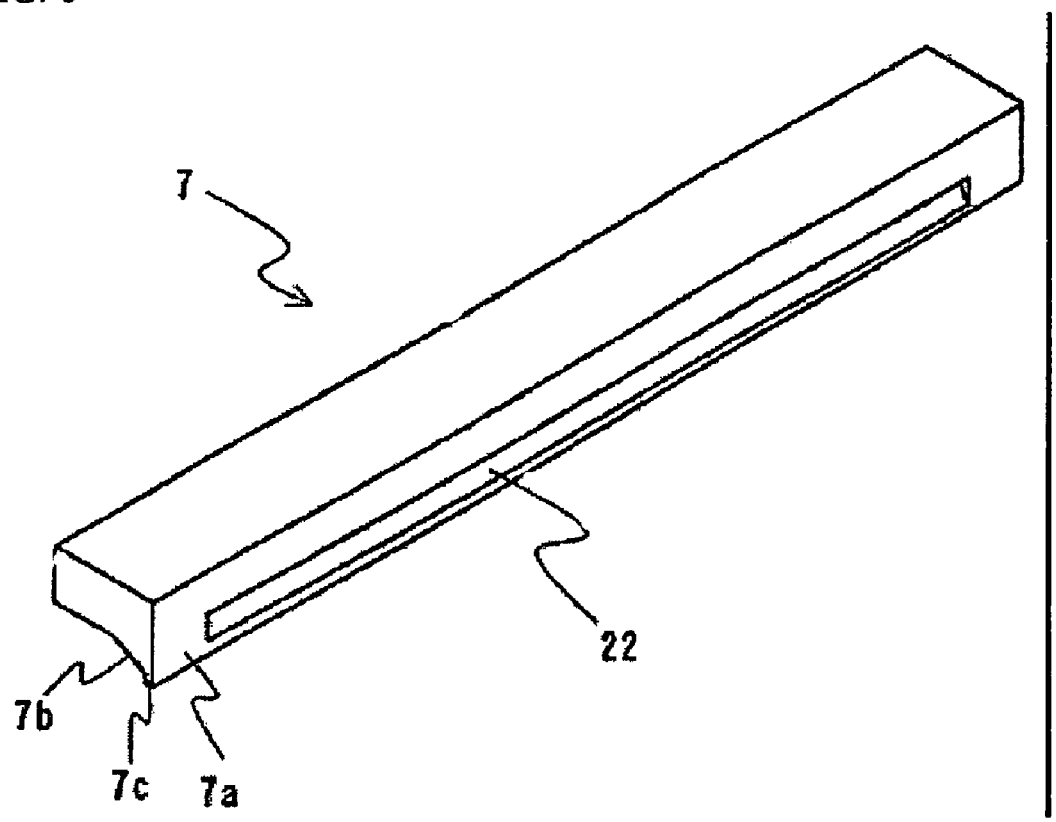
FIG. 6 is an oblique view of the rear nozzle block.

FIG. 6 is an oblique view of the rear nozzle block 7. The second lateral distribution flow route 22 is formed in the front face 7a of the rear nozzle block 7. When the slot nozzle assembly 2 is assembled, the rear face 6a of the front nozzle block at 6 faces the front face 7a of the rear nozzle block 7 with the shim plate 8 between them. The second lateral distribution flow route 22 extends along the longitudinal direction of the rear nozzle block 7 and faces the first lateral distribution flow route 21.

The converging portion 22a, which extends downward, is provided at the second lateral distribution flow route 22. The converging portion 22a has a depth, i.e. groove thickness, which decreases doing downward.

Figure 7:
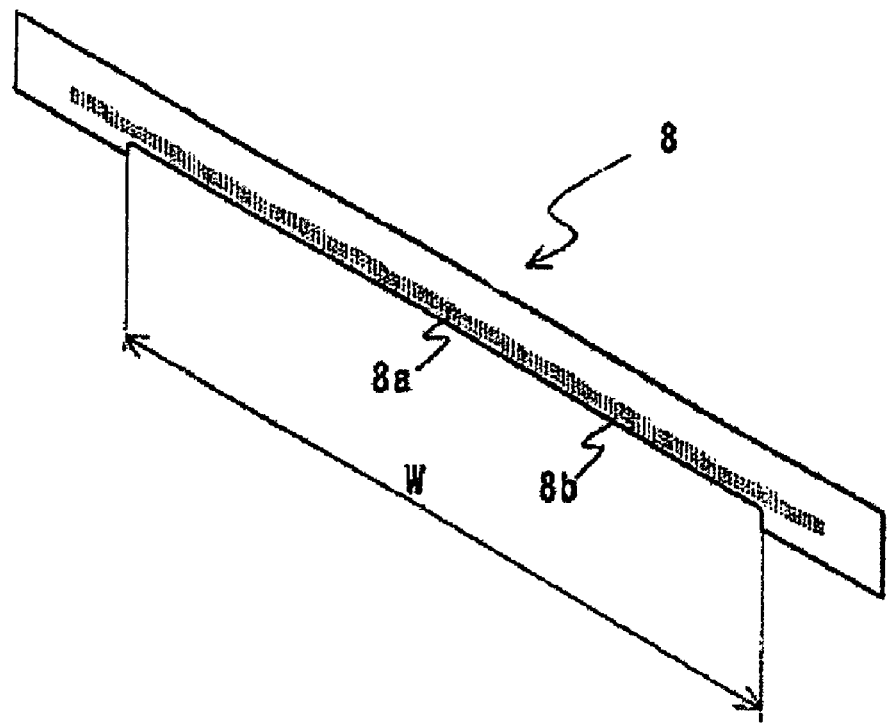
FIG. 7 is an oblique view of the shim plate.
Figure 8:
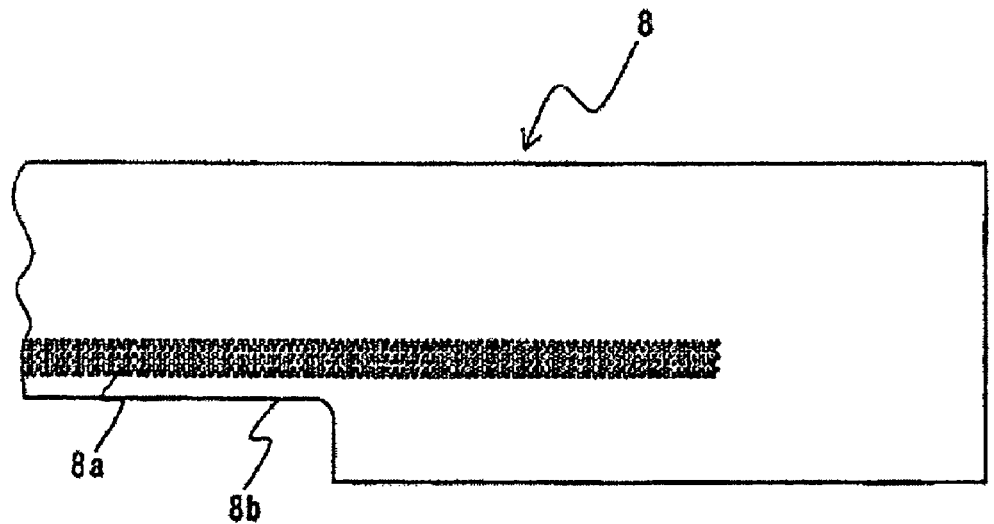
FIG. 8 is a partial enlarged view of the shin plate.

FIG. 7 is an oblique view of the shim plate 8. FIG. 8 is a partial enlarged view of the shim plate 8. The shim plate 8 is disposed between the front nozzle block 6 and the rear nozzle block 7. Many narrow through holes 8a are provided in the portion of the shim plate 8 facing the first lateral distribution flow route 21. The many narrow through holes 8a communicate between the first lateral distribution flow route 21 and second lateral distribution flow route 22.

Also, a cut-out part 8b is provided in the shim plate 8. The cut-out part 8b of the shim plate 8 defines the slot 23 using the rear face 6a of the front nozzle block at 6 and the front face 7a of the rear nozzle block 7. The width of the slot 23 is determined by the width W of the cut-out part 8b. The width of the slot 23 determines the width of the band of foam that is coated on the substrate 5.

It is possible to change the foam application pattern by changing the shape of the cut-out part 8b of the shim plate 8.

The many narrow through holes 8a of the shim plate 8 function as a restriction member for limiting the flow of the foamable melted material from the first lateral distribution flow route 21 to the second lateral distribution flow route 22. Because of the shim plate 8, the pressure of the foamable melted material inside the first lateral distribution flow route 21 is kept at critical pressure or higher. As a result, foaming inside the slot nozzle assembly 2 is prevented. Also, because of the shim plate 8, the foamable melted material inside the first lateral distribution flow route 21 is dispersed in the lateral direction. As a result, the pressure and speed distribution of the foamable melted material inside the first lateral distribution flow route 21 are made uniform. That is, the shim plate 8 functions as a dispersing plate.

The foamable melted material inside the first lateral distribution flow route 21 passes through the many narrow through holes 8a and flows to the second lateral distribution flow route 22. The foamable melted material passes through the converging portion 22a of the second lateral distribution flow route 22 and flows to the slot 23. The thickness T of the slot 23 is set small so that the pressure of the foamable melted material inside the second lateral distribution flow route 22 is kept at critical pressure or higher. The thickness T of the slot 23 can be changed by changing the thickness of the shim plate 8.

Figure 9:
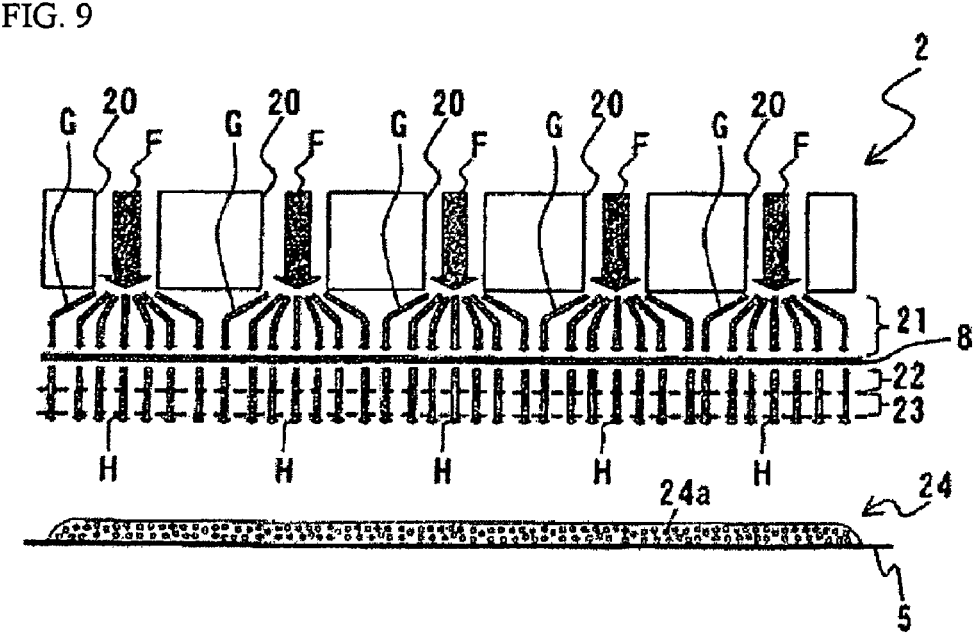
FIG. 9 is an explanatory drawing which schematically shows the flow of the foamable melted material in the interior of a slot nozzle assembly in accordance with this embodiment, and bubbles in the foam layer coated on the substrate.

FIG. 9 is an explanatory drawing which schematically shows the flow of the foamable melted material in the interior of a slot nozzle assembly in accordance with this embodiment, and bubbles in the foam layer coated on the substrate.

When the opening/closing valves (not shown in the drawing) of the valve assemblies 28 (FIG. 14) provided in the control module 3 open, the foamable melted material passes through the vertical passages 20 as indicated by arrows F and flows to the first lateral distribution flow route 21. At the first lateral distribution flow route 21, the foamable melted material is dispersed in the lateral direction along the first lateral distribution flow route 21 as indicated by arrows G, and passes through the many narrow through holes 8a of the shim plate 8 and flows to the second lateral distribution flow route 22. The many narrow through holes 8a of the shim plate 8 function as a restriction member for limiting the flow of the foamable melted material from the first lateral distribution flow route 21 to the second lateral distribution flow route 22, so the pressure of the foamable melted material inside the first lateral distribution flow route 21 is kept at critical pressure or higher. Also, the shim plate 8 functions as a dispersing plate, so the foamable melted material inside the first lateral distribution flow route 21 is dispersed in the lateral direction, and the pressure and speed distribution of the foamable melted material inside the first lateral distribution flow route 21 are made essentially uniform.

The foamable melted material inside the second lateral distribution flow route 22 passes through the converging portion 22a and flows to the slot 23. The thickness T of the slot 23 is set small, so the pressure of the foamable melted material inside the second lateral distribution flow route 22 is kept at critical pressure or higher. The foamable melted material extruded from the slot 23 foams and forms a foam layer 24 of a certain thickness on the substrate 5. The pressure and speed of the foamable melted material in the longitudinal direction of the slot 23 are essentially uniform, so the thickness of the foam layer 24 is essentially uniform in the substrate's width direction, and the diameters of bubbles 24a inside the foam layer 24 are also essentially uniform.

Figure 10:
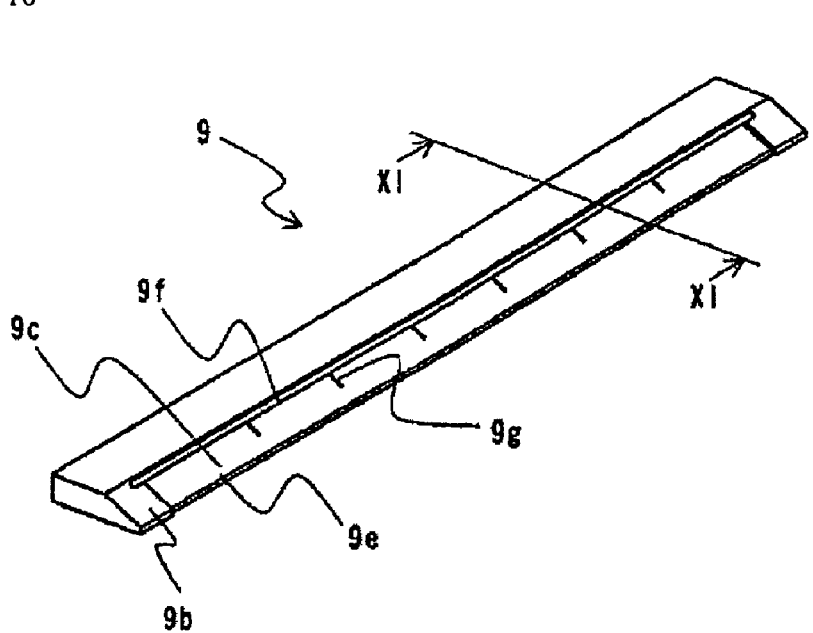
FIG. 10 is an oblique view of the air block.
Figure 11:
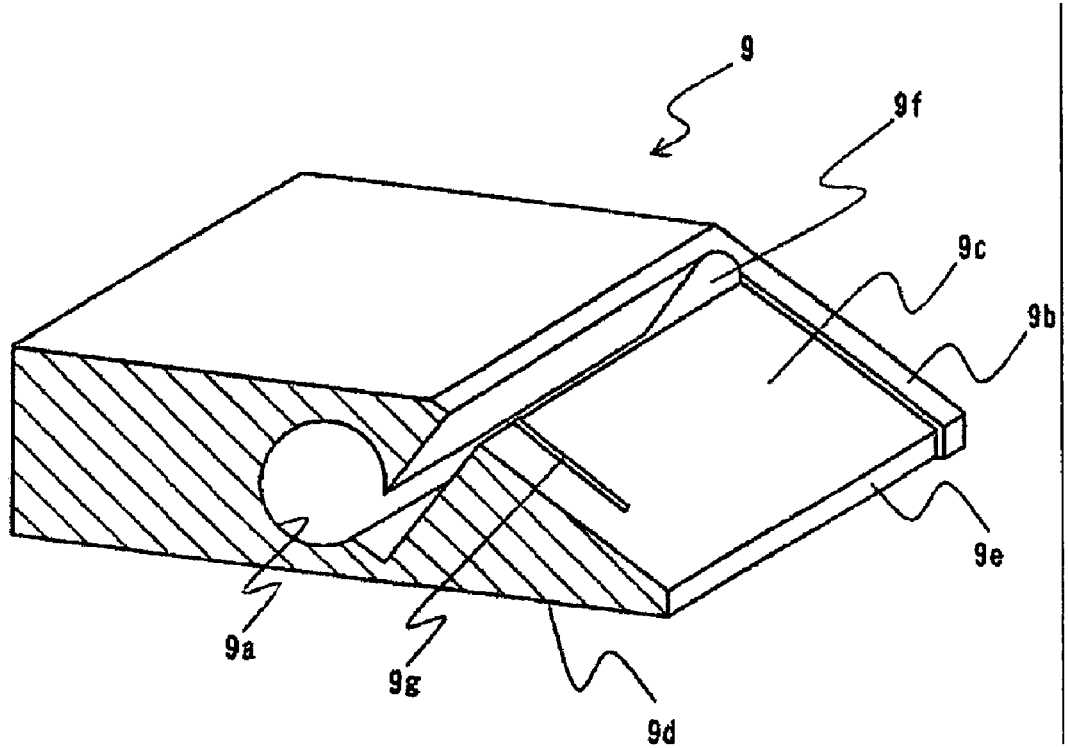
FIG. 11 is a cross-section view of the air block taken along line XI-XI in FIG. 10.

FIG. 10 is an oblique view of the air block 9. FIG. 11 is a cross-section view of the air block 9 taken along line XI-XI in FIG. 10.

The air block 9 is provided with a lateral air passage 9a extending inside the air block 9 in the longitudinal direction. The air block 9 is provided with a slanted groove 9c extending in the longitudinal direction at a slanted face 9b. One end of the slanted groove 9c is connected to a vertical groove 9e extending to the bottom face 9d of the air block 9. The other end of the slanted groove 9c is connected to a first slanted air passage 9f communicating with the lateral air passage 9a. A plurality of ribs 9g are provided at the slanted groove 9c for rectifying the flow of air. The plurality of ribs 9g extends downward along the slanted face from the other end of the slanted groove 9c.

Referring to FIG. 4, when the air block 9 is fitted to the rear nozzle block 7, the slanted groove 9c of the air block 9 and the bottom face 7b of the rear nozzle block 7 form a second slanted air passage 25. A rib part 7c that is capable of touching the substrate 5 is provided at the rear nozzle block 7. A side face 7d of the rib part 7c and a vertical groove 9e of the air block 9 form a vertical air passage 26. As a result, the hot air outlet 26a is formed as an air slit at the downstream side and near the foamable melted material outlet 23a of the slot 23. Hot air from the hot air outlet 26a smoothly peels the foam from the nozzle surface for transfer to the substrate.

Figure 12:
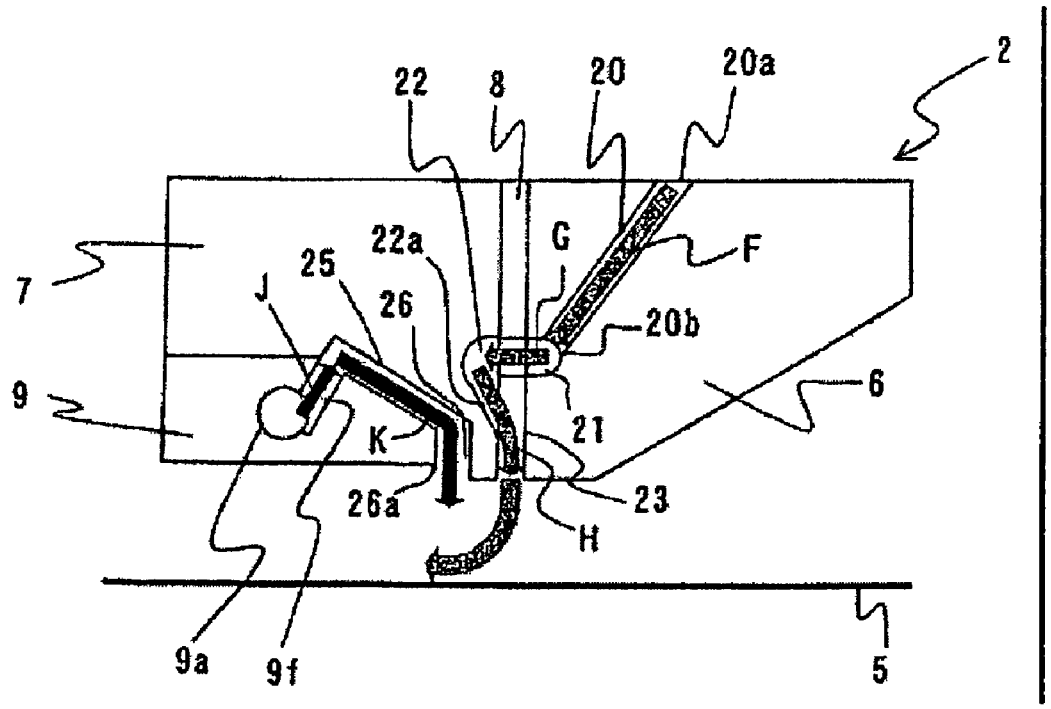
FIG. 12 is an explanatory diagram showing the flow of hot air.
Figure 13:
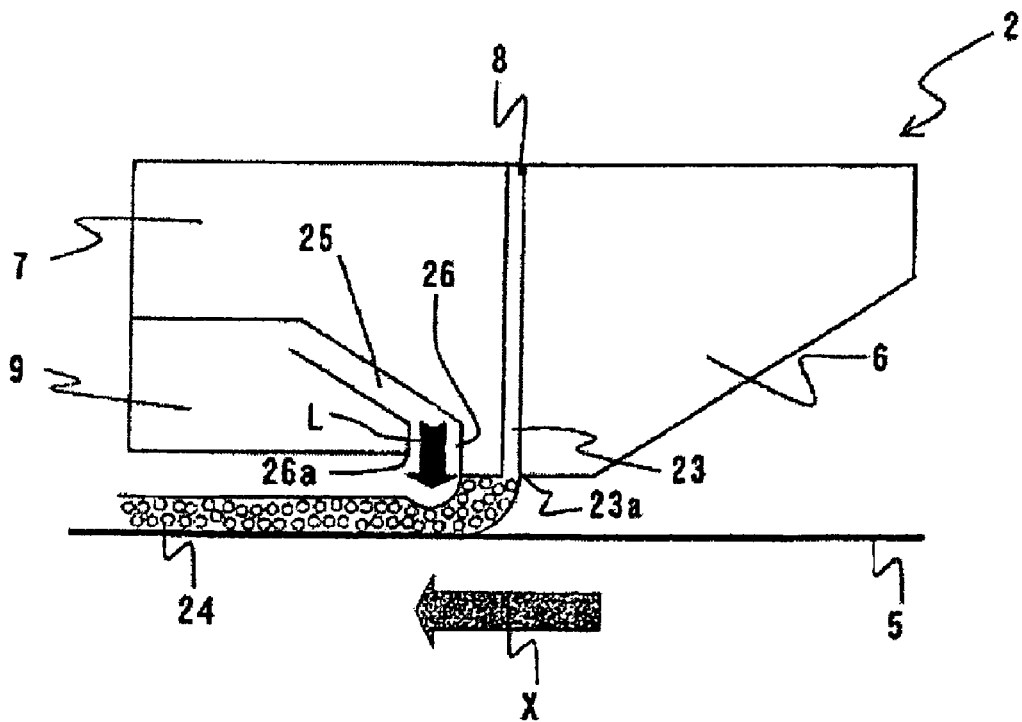
FIG. 13 is an explanatory diagram showing how the flow of hot air prevents the foam from rolling up.

FIG. 12 is an explanatory diagram showing the flow of hot air. FIG. 13 is an explanatory diagram showing how the flow of hot air prevents the foam from rolling up.

The lateral air passage 9a of the air block 9 communicates with the hot air source 10. The hot air source 10 supplies hot air to the lateral air passage 9a. The hot air, as indicated by arrows J and K, passes from the lateral air passage 9a through the first slanted air passage 9f and second slanted air passage 25 and flows to the vertical air passage 26. The hot air, as indicated by arrow L, is discharged from the hot air outlet 26a of the vertical air passage 26. The hot air prevents the foam of the foamable melted material extruded from the foamable melted material outlet 23a of the slot 23 from adhering to the slot nozzle assembly 2. Also, the hot air separates foam adhered to the slot nozzle assembly 2 from the surface of the slot nozzle assembly 2.

Figure 14:
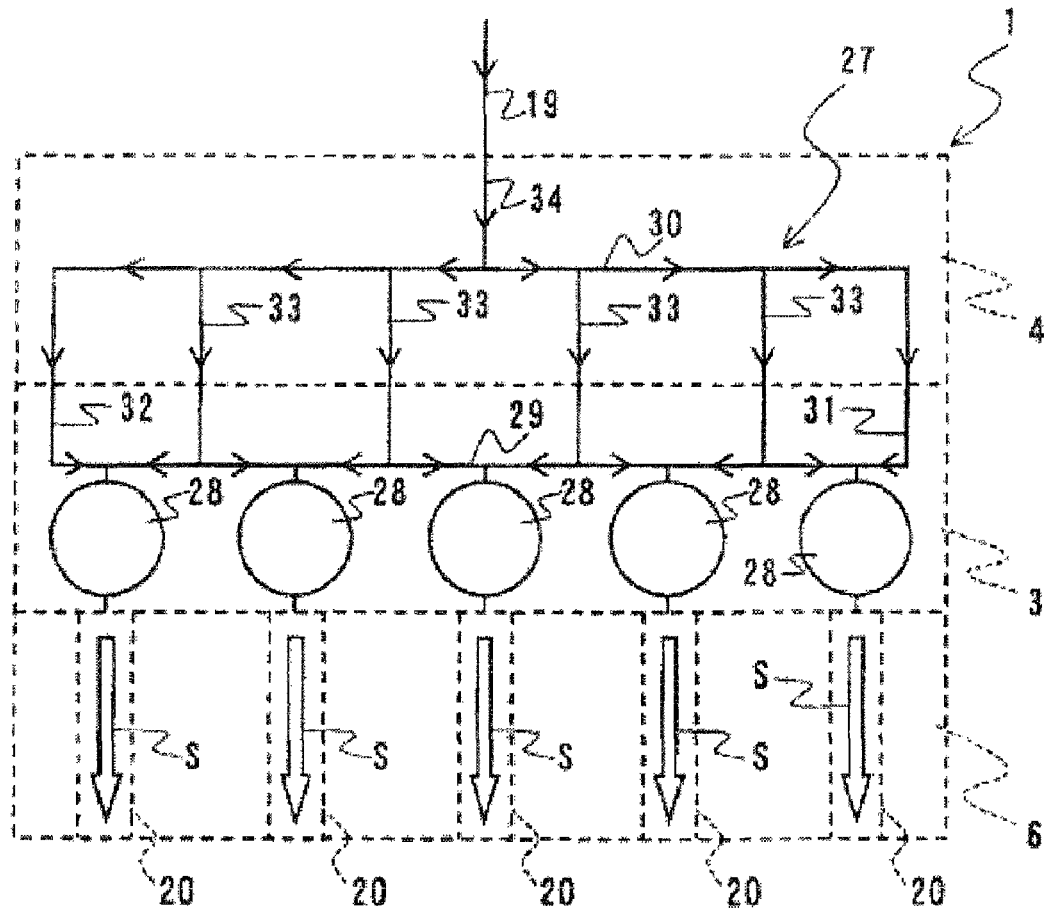
FIG. 14 is an explanatory diagram showing the ladder-type foamable melted material distribution manifold of the slot coating gun.

FIG. 14 is an explanatory diagram showing the ladder-type foamable melted material distribution manifold 27 of the slot coating gun 1.

Five valve assemblies 28 are provided in the control module 3, and these valve assemblies 28 respectively communicate with the vertical passages 20 provided in the front nozzle block 6. The first lateral distribution passage 29 is provided in the control module 3, and the first lateral distribution passage 29 communicates with the five valve assemblies 28. The second lateral distribution passage 30 is provided in the gun body 4. Both ends of the first lateral distribution passage 29 of the control module 3 and both ends of the second lateral distribution passage 30 of the gun body 4 communicate respectively via the end passage 31 and end passage 32. Also, the first lateral distribution passage 29 and the second lateral distribution passage 30 of the gun body 4 communicate by a traverse passage 33 between adjacent valve assemblies 28. The gun body 4 is provided with the inlet passage 34 connected to the hot melt hose 19 connected to the foamable melted material supply system 11; the inlet passage 34 is connected to the second lateral distribution passage 30. The foamable melted material distribution manifold 27 is constituted in a ladder shape by the second lateral distribution passage 30, end passage 31, end passage 32, and four traverse passages 33.

The foamable melted material goes from the foamable melted material supply system 11 through the hot melt hose 19 and inlet passage 34 and is sent to the ladder-style foamable melted material distribution manifold 27. The inlet passage 34 is connected to essentially the center of the second lateral distribution passage 30 of the gun body 4. Foamable melted material from the inlet passage 34 is distributed left and right from essentially the center of the second lateral distribution passage 30, and flows to the traverse passages 33 and the end passage 31 and end passage 32 respectively at both ends of the lateral distribution passage 30. Foamable melted material from the traverse passages 33, end passage 31, and end passage 32 enters the first lateral distribution passage 29 of the control module 3. The foamable melted material is supplied to the respective five valve assemblies 28 communicating with the first lateral distribution passage 29 from both directions of the first lateral distribution passage 29. Therefore, the pressure and flow amount of the foamable melted material supplied to the five valve assemblies 28 are essentially the same. Accordingly, the pressure and flow amount of the foamable melted material supplied from the valve assemblies 28 to the vertical passages 20 of the front nozzle block 6 are essentially uniform, as indicated by the thickness of the arrows S in FIG. 14. In this manner, by providing the ladder-type foamable melted material distribution manifold 27 of the present embodiment, the pressure and flow amount of the foamable melted material supplied to the plurality of the valve assemblies 28 become essentially uniform.

According to the present embodiment, it is possible to keep the pressure of the foamable melted material inside the slot nozzle assembly at critical pressure or higher and to prevent foaming in the interior.

The design of the new flow route makes it possible to achieve uniform flow speed and pressure in the process of dispersing thinly and widely.

The hot air discharged from the slit-shaped hot air outlet provided downstream from the slot makes it possible to peel foam extruded from the slot from the nozzle and to assist in transfer of the foam to the substrate.

If the foamable melted material is a foaming adhesive, it is possible to form a thick adhesive layer with just a little adhesive, and to conserve on material expenses.

A soft foam layer acts as a cushion. Also, it is possible to glue adhesive tape to a nonuniform surface.

The thickness of the foam coated on a substrate can be made essentially uniform.

The device and method for extruding a foamable melted material according to the present invention can be generally applied to all contact coating which uses a slot nozzle, such as label gluing, seals, gaskets, etc.

The "foamable melted material" in this specification is a mixture of a polymeric substance and a gas. For example, the foamable melted material is one in which a gas such as air or nitrogen or carbon dioxide, etc. is dissolved under pressure in a unvulcanized rubber, saturated polyester, polyamide, polyolefin, polyolefin copolymer or a modification thereof. At atmospheric pressure the gas dissolved in the foamable melted material foams and creates a multitude of independent bubbles, and its volume swells in a range from 1.5 times to 5 times.

The present invention is not limited to the above embodiment, and can be practiced in various other configurations without deviating from its features. Therefore, the above-described embodiment is merely an example of each point, and is not to be interpreted as limiting. The scope of the present invention is indicated by the claims, and is not restricted whatsoever by the specification text. In addition, variations and modifications belonging to the same scope as the patent claims are all within the scope of the present invention.

What is claimed is:

1. A slot nozzle assembly for extruding a foamable melted material in a wide band, comprising:
   a plurality of foamable melted material passages,
   a lateral distribution flow route communicating with said plurality of foamable melted material passages,
   a shim plate disposed inside and extending across said lateral distribution flow route so as to divide said lateral distribution flow route into a first lateral distribution flow route and a second lateral distribution flow route, said shim plate including a plurality of through holes providing fluid communication between said first and second lateral distribution flow routes, said through holes each defining a hole width,
   a slot for discharging foamable melted material, said slot defining a slot width that is larger than the respective hole widths of said through holes, and
   a converging portion communicating with said lateral distribution flow route and said slot, the converging portion including a cross sectional area which gradually becomes smaller toward said slot,
   wherein said shim plate has a thinness that defines a thickness of said slot to be small so that the foamable melted material inside said converging portion is kept at a pressure that prevents foaming of the foamable melted material.

2. A slot nozzle assembly according to claim 1, wherein:
   said second lateral distribution flow route includes said converging portion, and
   said shim plate restricts fluid flow from said first lateral distribution flow route to said second lateral distribution flow route such that the pressure of the foamable melted material inside said first lateral distribution flow route is held at a pressure that prevents foaming of the foamable melted material in said first lateral distribution flow route.

3. A slot nozzle assembly according to claim 2, wherein said shim plate has a cut-out part defining the shape of said slot.

4. A slot nozzle assembly according to claim 1, wherein the foamable melted material extruded from the slot nozzle assembly is adapted to be applied to a substrate moving in a transport direction, and the slot nozzle assembly further comprises:
   a hot air outlet for discharging hot air and located downstream of said slot in the transport direction.

5. A slot nozzle assembly for extruding a foamable melted material in a wide band, comprising:
   a front nozzle block having a rear face and provided with a plurality of foamable melted material passages and a first lateral distribution flow route communicating with said plurality of foamable melted material passages,
   a rear nozzle block having a front face and provided with a second lateral distribution flow route disposed opposite said first lateral distribution flow route and with a converging portion having a cross-sectional area that gradually becomes smaller extending downward from said second lateral distribution flow route; and
   a shim plate positioned between said front nozzle block and said rear nozzle block, said shim plate including:
   a plurality of through holes providing fluid communication between said first lateral distribution flow route and said second lateral distribution flow route, said through holes each defining a hole width, and
   a cut-out part operable with said rear face of said front nozzle block and said front face of said rear nozzle block to define a wide slot, said shim plate having a thinness that defines a thickness of said slot to be small so that the foamable melted material inside said converging portion is kept at a pressure that prevents foaming of the foamable melted material, and said slot defining a slot width that is larger than the respective hole widths of said through holes.

6. A slot nozzle assembly according to claim 4, wherein said hot air outlet and said slot are each oriented parallel to each other and generally vertically.

7. A slot coating gun for extruding a foamable melted material in a wide band, comprising:
   an inlet passage for receiving foamable melted material,
   a plurality of valve assemblies,
   a foamable melted material distribution manifold communicating with said inlet passage and said plurality of valve assemblies,
   a plurality of foamable melted material passages respectively communicating with said plurality of valve assemblies,
   a lateral distribution flow route communicating with said plurality of foamable melted material passages,
   a shim plate disposed inside and extending across said lateral distribution flow route so as to divide the lateral distribution flow route into a first lateral distribution flow route and a second lateral distribution flow route, said shim plate including a plurality of through holes providing fluid communication between the first and second lateral distribution flow routes,
   a slot for discharging foamable melted material, and
   a converging portion communicating with said lateral distribution flow route and said slot, the converging portion including a cross sectional area which gradually becomes smaller toward said slot;
   wherein said foamable melted material distribution manifold comprises a first lateral distribution passage including two ends and communicating with said plurality of valve assemblies, a second lateral distribution passage including two ends and communicating with said inlet passage, two end passages respectively connecting said two ends of said first lateral distribution passage with said two ends of said second lateral distribution passage, and a plurality of traverse passages connecting said first lateral distribution passage and said second lateral distribution passage at points respectively between adjacent valve assemblies.

8. A slot coating gun of claim 7, wherein a pressure and flow amount of the foamable melted material supplied to each of said plurality of valve assemblies is essentially uniform and the pressure and flow amount of the foamable melted material respectively supplied from each of said plurality of valve assemblies to each of said plurality of foamable melted material passages is essentially uniform.

9. A slot coating gun of claim 8, wherein the foamable melted material discharged from said slot forms a foam layer with an essentially uniform thickness in the substrate width direction.

10. A slot coating gun of claim 9, wherein bubbles inside the discharged foam layer have essentially uniform diameters.

11. A slot coating gun according to claim 7, wherein:
said second lateral distribution flow route includes said converging portion, and
said shim plate restricts fluid flow from said first lateral distribution flow route to said second lateral distribution flow route such that the pressure of the foamable melted material inside said first lateral distribution flow route is held at a pressure that prevents foaming of the foamable melted material in said first lateral distribution flow route.

12. A slot coating gun according to claim 11, wherein said shim plate has a cut-out part defining the shape of said slot.

13. A slot coating gun according to claim 7, wherein the foamable melted material extruded from the slot coating gun is coated onto a substrate moving in a transport direction, and the slot coating gun further comprises:
a hot air outlet for discharging hot air and located downstream of said slot in the transport direction.

14. A slot coating gun according to claim 13, wherein said hot air outlet and said slot are each oriented parallel to each other and generally vertically.

15. A slot coating gun for extruding a foamable melted material in a wide band, comprising:
an inlet passage for receiving foamable melted material,
a plurality of valve assemblies,
a foamable melted material distribution manifold communicating with said inlet passage and said plurality of valve assemblies,
a slot nozzle assembly including a plurality of foamable melted material passages respectively communicating with said plurality of valve assemblies, and
a slot for discharging foamable melted material and communicating with said plurality of foamable melted material passages, and
wherein said foamable melted material distribution manifold comprises a first lateral distribution passage including two ends and communicating with said plurality of valve assemblies, a second lateral distribution passage including two ends and communicating with said inlet passage, two end passages respectively connecting said two ends of said first lateral distribution passage with said two ends of said second lateral distribution passage, and a plurality of traverse passages connecting said first lateral distribution passage and said second lateral distribution passage at points respectively between adjacent valve assemblies.

16. A slot coating gun of claim 15, wherein a pressure and flow amount of the foamable melted material supplied to each of said plurality of valve assemblies is essentially uniform and the pressure and flow amount of the foamable melted material respectively supplied from each of said plurality of valve assemblies to each of said plurality of foamable melted material passages is essentially uniform.

17. A slot coating gun of claim 16, wherein the foamable melted material discharged from said slot forms a foam layer with an essentially uniform thickness in the substrate width direction.

18. A slot coating gun of claim 17, wherein bubbles inside the discharged foam layer have essentially uniform diameters.

19. A slot coating gun according to claim 15, wherein the foamable melted material extruded from the slot coating gun is coated onto a substrate moving in a transport direction, and the slot coating gun further comprises:
a hot air outlet located downstream of said slot in the transport direction, said hot air outlet configured to dispense hot air to prevent the foamable melted material extruded from said slot from adhering to the slot coating gun.

20. The slot nozzle assembly of claim 5, wherein the wide slot extrudes the foamable melted material on a substrate moving in a transport direction, and the assembly further comprises:
an air block coupled to said rear nozzle block and including a hot air outlet located downstream of said slot in the transport direction, said hot air outlet configured to dispense hot air to prevent the foamable melted material extruded from said slot from adhering to said rear nozzle block.

21. A slot nozzle assembly of claim 20, wherein said air block further includes a slated face facing toward said rear nozzle block, a lateral air passage extending inside said air block in a longitudinal direction, and a slanted groove extending in the longitudinal direction at said slanted face.

22. A slot nozzle assembly of claim 21, wherein said air block further includes a bottom face, and wherein said slanted groove includes a first end connected to a vertical groove extending to said bottom face and a second end connected to a first slanted air passage communicating with said lateral air passage.

23. A slot nozzle assembly of claim 21, wherein said air block further includes a plurality of ribs extending downward along said slanted face and located at said slanted groove for rectifying the flow of air.

24. A slot nozzle assembly of claim 21, wherein said slanted groove of said air block and a bottom face of said rear nozzle block form a second slanted air passage.

25. A slot nozzle assembly of claim 20, wherein said rear nozzle block further includes a rib part configured to touch the substrate, said rib part including a side face, and wherein said air block further includes a vertical groove that defines a vertical air passage for hot air with said side face of said rib part.

* * * * *

UNITED STATES PATENT AND TRADEMARK OFFICE
CERTIFICATE OF CORRECTION

| | |
|---|---|
| PATENT NO. | : 8,347,809 B2 |
| APPLICATION NO. | : 12/174867 |
| DATED | : January 8, 2013 |
| INVENTOR(S) | : Shinya Takahashi et al. |

Page 1 of 1

It is certified that error appears in the above-identified patent and that said Letters Patent is hereby corrected as shown below:

Column 14

Claim 21, line 29, change "slated" to --slanted--.

Signed and Sealed this
Ninth Day of April, 2013

Teresa Stanek Rea
*Acting Director of the United States Patent and Trademark Office*